US012769810B2

(12) United States Patent
Hietanen et al.

(10) Patent No.: US 12,769,810 B2
(45) Date of Patent: Oct. 20, 2026

(54) METHOD AND SYSTEM FOR DYNAMIC LICENSE ALLOCATION

(71) Applicant: Invertion Oy, Rauma (FI)

(72) Inventors: Juha Hietanen, Eurajoki (FI); Mika Tuomala, Kortela (FI); Niko Pakula, Rauma (FI)

(73) Assignee: Invertion Oy, Rauma (FI)

( * ) Notice: Subject to any disclaimer, the term of this patent is extended or adjusted under 35 U.S.C. 154(b) by 0 days.

(21) Appl. No.: 19/076,048

(22) Filed: Mar. 11, 2025

(65) Prior Publication Data

US 2025/0291884 A1 Sep. 18, 2025

(30) Foreign Application Priority Data

Mar. 15, 2024 (FI) ..................................... 20245312

(51) Int. Cl.
*G06F 21/10* (2013.01)

(52) U.S. Cl.
CPC ........ *G06F 21/108* (2023.08); *G06F 21/1078* (2023.08)

(58) Field of Classification Search
CPC . G06F 21/108; G06F 21/121; H04L 2463/101
See application file for complete search history.

(56) References Cited

U.S. PATENT DOCUMENTS

2016/0140204 A1* 5/2016 Brown .................. G06F 16/254 707/602
2018/0062921 A1* 3/2018 Jones ..................... G06Q 50/00
2018/0321928 A1 11/2018 Borthakur et al.

(Continued)

FOREIGN PATENT DOCUMENTS

WO 2022201281 9/2022
WO 2022201281 A1 9/2022
WO WO-2025183938 A1 * 9/2025 ............. G06F 9/547

OTHER PUBLICATIONS

Rong; Anewevaluationcriterionforallocation Mechanismswithapplicationtovehicle License Allocations in China; Journal of mechanism and institution design (Online), Nov. 2019, vol. 4 (1), p. 39-86.*

(Continued)

*Primary Examiner* — Ilse I Immanuel

(74) *Attorney, Agent, or Firm* — Ziegler IP Law Group, LLC.

(57) ABSTRACT

A method for dynamic allocation of license for accessing target application (TA) within organization, organization comprising user devices (UDs) associated with TA, method includes, providing set of licenses (SOL) including license(s) available to be allocated to UD(s), number of available license(s) is less than number of UDs; receiving first information (FI) for each of UDs; determining if usage state of TA for one UD is active state; when TA for UD(s) is in active state, allocating, to each of UD(s), available license for accessing TA, and marking allocated license(s) as unavailable from SOL; and determining if usage state of TA for UD(s) changes from active state to inactive state; and when TA for UD(s) changes from active state to inactive state, deallocating, for each of UD(s), corresponding allocated license, and marking deallocated license(s) as available in SOL.

10 Claims, 6 Drawing Sheets

(56) References Cited

U.S. PATENT DOCUMENTS

| | | | | |
|---|---|---|---|---|
| 2019/0163456 | A1* | 5/2019 | Borthakur ............ | G06F 21/105 |
| 2020/0302032 | A1 | 9/2020 | Gopireddy | |
| 2023/0252112 | A1 | 8/2023 | Rao | |

OTHER PUBLICATIONS

European Patent Office, Extended European Search Report, Application No. 25162784.0-1218, Dated May 7, 2025, 8 Pages.

Finnish Patent and Registration Office, Search Report, Patent Application No. 20245312, Dated Nov. 15, 2024, 3 Pages.

* cited by examiner

METHOD AND SYSTEM FOR DYNAMIC LICENSE ALLOCATION

TECHNICAL FIELD

The present disclosure relates to methods for dynamic allocation of licenses for accessing target applications. Moreover, the present disclosure relates to systems for dynamic allocation of licenses for accessing target applications.

BACKGROUND

Typically, license allocation for accessing computing applications is a crucial practice for organizations to effectively control and optimize a use of limited number of licenses available for devices associated with the organizations. Generally, the number of licenses available for allocation are always less than a number of devices. The present solutions for license allocation to the devices involves a use of an auto logged-in feature. In this feature, whenever a given device is logged in, a corresponding license is automatically allocated to that device from a pool of available licenses for accessing the computing application.

However, the present solutions fail to keep check whether the logged-in given device is actually using the computing application or not. The present solutions work on an assumption that the given device that is logged-in is using the computing application, which hinders the effective allocation of licenses for those devices which are in need of using the computing application but are unable to access it, due to an unavailability of the licenses.

Therefore, in light of the foregoing discussion, there exists a need to overcome the aforementioned drawbacks.

SUMMARY

The aim of the present disclosure is to provide a method and a system to dynamically allocate a limited number of licenses for accessing a target application based on a usage state of the target application. The aim of the present disclosure is achieved by a method and a system for dynamic license allocation as defined in the appended independent claims to which reference is made to. Advantageous features are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
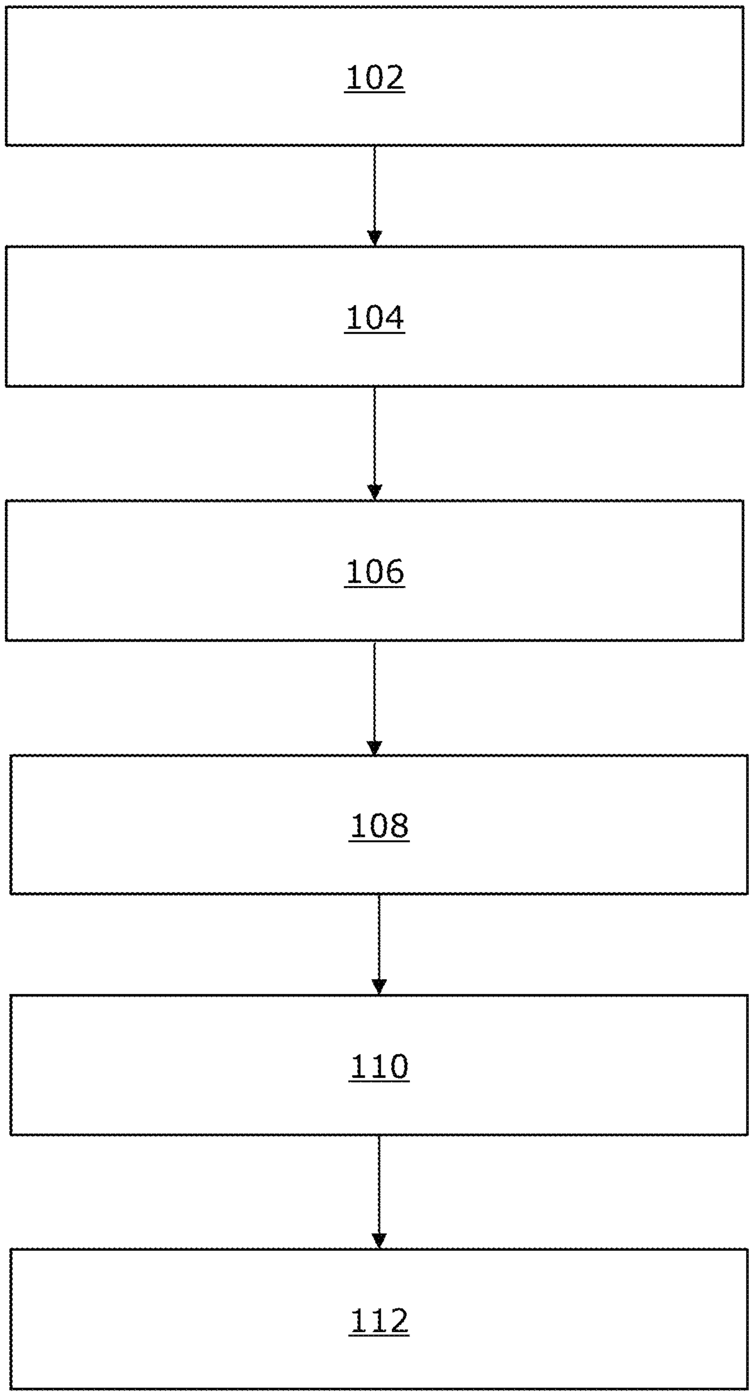
FIG. 1 is an illustration of a flowchart depicting steps of a method for dynamic allocation of a license for accessing a target application within an organization, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for dynamic allocation of a license for accessing a target application within an organization, the organization comprising a plurality of user devices associated with the target application, the method comprising:

- providing a set of licenses comprising one or more licenses available to be allocated to the plurality of user devices, where number of available one or more licenses is less than number of user devices;
- receiving a first information for each of the plurality of user devices, wherein the first information is indicative of a usage state of the target application on a corresponding user device;
- determining if the usage state of the target application for at least one user device is an active state;
- when the target application for the at least one user device is in the active state, allocating, to each of the at least one user device, an available license for accessing the target application, and marking the at least one allocated license as unavailable from the set of licenses;
- determining if the usage state of the target application for the at least one user device changes from the active state to an inactive state; and
- when the target application for the at least one user device changes from the active state to the inactive state, deallocating, for each of the at least one user device, the corresponding allocated license, and marking the at least one deallocated license as available in the set of licenses.

The present disclosure provides an aforementioned method that improves an efficiency in the dynamic allocation of the license. The efficiency of current license pool can be utilized more efficient with the invention of present disclosure. Moreover, the improved dynamic allocation of the license facilitates a timely access to the target application, for the plurality of user devices within the organization. Moreover, the method provides for cost effective utilization of the set of licenses provided for the organization. Furthermore, the method is able to remove unnecessary allocation of licenses by deallocating the corresponding allocated license for each of the at least one user device whose usage state changes from the active state to the inactive state, which enables an efficient management of the set of licenses, ensuring that the deallocated licenses are available for reallocation.

In a second aspect, the present disclosure provides a system for dynamic allocation of a license for accessing a target application within an organization, the organization comprising a plurality of user devices associated with the target application, the system comprising a license allocation server communicably coupled to the plurality of user devices, the license allocation server configured to:

provide a set of licenses comprising one or more licenses available to be allocated to the plurality of user devices, wherein number of available one or more licenses is less than number of user devices;

receive a first information for each of the plurality of user devices, wherein the first information is indicative of a usage state of the target application on a corresponding user device;

determine if the usage state of the target application for at least one user device is an active state;

when the target application for the at least one user device is in the active state, allocate, to each of the at least one user device, an available license to access the target application, and to mark the at least one allocated license as unavailable from the set of licenses;

determine if the usage state of the target application for the at least one user device changes from the active state to an inactive state; and when the target application for the at least one user device changes from the active state to the inactive state, deallocate, for each of the at least one user device, the corresponding allocated license, and to mark the at least one deallocated license as available in the set of licenses.

The present disclosure provides an aforementioned system that improves an efficiency in the dynamic allocation of the license. Moreover, the improved dynamic allocation of the license facilitates a timely access to the target application, for the plurality of user devices within the organization. Moreover, the system provides for cost effective utilization of the set of licenses provided for the organization. Furthermore, the system is able to remove unnecessary allocation of licenses by deallocating the corresponding allocated license for each of the at least one user device whose usage state changes from the active state to the inactive state, which enables an efficient management of the set of licenses, ensuring that the deallocated licenses are available for reallocation.

In a third aspect, the present disclosure provides a computer-readable storage medium comprising instructions for dynamic allocation of a license for accessing a target application, which when executed by a processing arrangement, cause the processing arrangement to execute the aforementioned method of the first aspect.

The present disclosure provides an aforementioned computer-readable storage medium that improves an efficiency in the dynamic allocation of the license. Moreover, the improved dynamic allocation of the license facilitates a timely access to the target application, for the plurality of user devices within the organization. Moreover, the computer-readable storage medium provides for cost effective utilization of the set of licenses provided for the organization. Furthermore, the computer-readable storage medium is able to remove unnecessary allocation of licenses by deallocating the corresponding allocated license for each of the at least one user device whose usage state changes from the active state to the inactive state, which enables an efficient management of the set of licenses, ensuring that the deallocated licenses are available for reallocation.

Throughout the present disclosure, the term “organization” as used herein refers to a company, an institution, an association, a government body and the like, where the plurality of user devices are used by plurality of users within the organization. The term “plurality of user devices” as used herein refers to a wide range of gadgets and devices such as, but not limited to, computers, desktops, laptops, smartphones and tablets, that the plurality of users employ to run the target application.

The term “target application” as used herein refers to a specific application that performs a specific function on any computing device, wherein, the target application is accessed via the license. Subsequently, the dynamic allocation of the license enables the plurality of user devices within the organization to access the target application. Typically, the target application is used with a purpose to assist the plurality of user devices, in performing specific computing tasks. Optionally, the target application may be of different types (such as google chrome, adobe, and the like) which is used by the plurality of user devices within the organization to perform different types of computing tasks. For example, the target application may be used by the plurality of user devices as a document management system, information management, data management of the organization and the like. Optionally, the target application may be installed on the plurality of user devices. Alternatively, the target application may be accessed by the plurality of user devices via internet.

Optionally, the target application comprises a sub module and the one or more licenses available to be allocated is a license to use the sub module. The term “sub module” as used herein refers to a discrete and self-contained module within the target application. Typically, the sub module is developed, tested and maintained independently, wherein the sub module is designed to perform specific functions within the target application. Moreover, the sub module within the target application requires the license for its usage. The license is allocated to the plurality of user devices that provides access to use the sub module. Notably, restricting the use of the sub module with the license ensures that only that user device amongst the plurality of user devices, which has the license that is valid can access and use the sub module. Beneficially, the use of sub modules allows for greater flexibility in use of the target application. The efficiency of current license pool can be utilized more efficient with the invention.

Throughout the present disclosure the term “license” as used herein refers to an agreement that grants an authenticated user, the right to use the target application. Typically, the license is provided by a service provider. Moreover, the license enables the plurality of user devices to use the target application. Notably, the license facilitates the plurality of user devices to securely access the target application. Furthermore, access of the target application with the license, reduces security breaches as well as make the security breaches easily detectable. Optionally, a type of the allocated license is one of: a named license, a floating license, a read-only license. The term “named license” as used herein refers to that type of license which is compatible to be allocated to only a specific user device (associated with a specific user) from amongst the plurality of user devices. Each user is uniquely identified by their name, username or another unique identifier and the named license is associated with that specific user. The named license grants access to the target application only for the user to whom it is assigned. Notably, the named license is not shareable among the plurality of users. The term “floating license” as used herein refers to that type of license that is compatible to be allocated to any user device from amongst the plurality of user devices. The term "read-only license" as used herein refers to that type of license that restricts the plurality of users to only view or read the target application's content or the target application's features without allowing to modify or create new content or data in the target application. Typically, the read-only license is primarily intended for scenarios where any user needs to view the target application's content but without requiring to make any changes to the target application's content. In this regard, it may be appreciated that the three different types of licenses work differently. A technical effect is that the dynamic allocation of the license is effectively performed for different types of licenses.

The term "dynamic allocation" as used herein refers to a flexible and efficient distribution of the license for accessing the target application based on real-time demand and usage state, of the plurality of user devices. Typically, the dynamic allocation of the license allows the organization to optimize a use of the set of license available with the organization for enabling the plurality of user devices to access the target application. Beneficially, the dynamic allocation of the license removes a challenge of license management for the organization. Notably, the dynamic allocation of the license enables to prevent scenarios where the license is being allocated that user device whose usage state is inactive, while another user device whose usage state is active is not allocated with the license for accessing the target application. Moreover, the dynamic allocation of the license solves an issue of static allocation, where the user device to which the license is to be allocated is pre-assigned and fixed, with considering the real-time demand and usage state of the plurality of users. Notably, the dynamic allocation of the license optimizes resources of the organization in comparison to another organization, which allocate licenses on a basis of assumption of use of the target application.

The term "set of licenses" as used herein refers to a predefined number of licenses offered by a service provider to the organization for enabling the plurality of user devices of the organization to access the target application. The set of licenses provided limits a number of licenses available with the organization for allocating to the plurality of user devices. Optionally, the set of licenses are purchased, by the organization, from a third-party vendor associated with the target application. Moreover, the target application may have any technical limitation that restricts the set of licenses provided for the organization. The term "licenses available to be allocated" as used herein refers to those licenses from amongst the set of licenses that are not allocated to any of the plurality of user devices yet, and subsequently, are available to be allocated to the plurality of user devices for accessing the target application. It will be appreciated that the "one or more licenses available to be allocated" refers to "one license available to be allocated" in some implementations, and "a plurality of licenses available to be allocated" in other implementations. Notably, a number of the one or more licenses available to be allocated is less than the number of the plurality of user devices within the organization. For example, a given organization comprising 20 user devices is provided with 10 licenses, wherein 5 licenses are available to be allocated to the plurality of user devices.

The term "usage state" as used herein refers to a current status of the target application that determines whether the target application is being used by the corresponding user device or not, in a current instance of time. The term "corresponding user device" as used herein refers to a given user device amongst the plurality of user devices, for which the first information regarding the usage state of the target application is received, and for which the usage state is subsequently, determined. Notably, the usage state is determined for each corresponding user device from amongst the plurality of user devices. It will be appreciated that the usage state of the corresponding user device enables to determine whether the corresponding user device requires the license for accessing the target application or not. The term "first information" as used herein refers to an information that enables to determine the usage state of the target application for the corresponding user device. Notably, receiving the first information for each of the plurality of user devices enables to determine the usage state of each of the plurality of user devices.

Throughout the present disclosure the term "active state" as used herein refers to that usage state in which the target application is opened on the corresponding user device. It will be appreciated that the usage state of the corresponding user device being the active state implies that the corresponding user device wants to use the target application at a current instance of time. The term "at least one user device" as used herein refers to those one or more user devices from amongst the plurality of user devices in which the target application is opened at the current instance of time. Notably, determining the at least one user device for which the usage state is the active state enables to identify the at least one user device that wants to use the target application and thus, requires the license to be allocated for accessing the target application.

Optionally, the usage state of the target application for the at least one user device is the active state, when at least one of:

- an executable process associated with the target application is implemented on the at least one user device;
- at least one user device identification indicates corresponding at least one user logging into the target application;
- the executable process associated with the target application performs a predetermined number of actions during a predefined time period.

In this regard, the term "executable process" refers to an execution of a task or a feature of the target application. Typically, the executable process allows the target application to run and perform its functions. Notably, the executable process associated with the target application being implemented on the at least one user device implies that the target application is opened and is being actively used on the at least one user device, and thus the usage state of the target application for the at least one user device is the active state. The term "at least one user logging into the target application" as used herein refers to an action of the at least one user of the at least one user device, providing credentials such as username and password to authenticate their identity to the target application. Typically, the at least one user logging into the target application is a security measure to ensure that the at least one user can open and use the target application only after authentication. The term "at least one user device identification" refers to a process of authenticating the at least one user device associated with the at least one user after the corresponding at least one user logs into the target application. Notably, the at least one user device identification indicating the corresponding at least one user logging into the target application implies that the target application is opened and is being actively used on the at least one user device, and thus the usage state of the target application for the at least one user device is the active state. The term "predetermined time period" as used herein refers to a specific time duration that is used determine a number of actions performed by the target application during that specific time duration. Typically, the actions performed by the target application, while the target application is running is continuously monitored. The term "predetermined number of actions" refers to a specific number of actions that are performed by the target application on the at least one user device. Notably, the target application performing the predetermined number of actions within the predetermined time period implies that the target application is opened and is being actively used on the at least one user device, and thus the usage state of the target application for at least one user device is the active state. A technical effect is that an accuracy of determining if the usage state of the target application for at least one user device is the active state, significantly improves.

The term "available license" as used herein refers to a license from a set of licenses, that is currently unused and is available to be allocated to the at least one user device for accessing the target application. Notably, allocating the available license to each of the at least one user device implies that the each of the at least one user device that wants to use target application is allocated with the available license for accessing the target application. The term "allocated license" as used herein refers to that license that has been allocated to a corresponding user device from amongst the at least one user device for accessing the target application. Subsequently, the at least one allocated license comprises a corresponding allocated license for each of the at least one user device. Notably, marking the at least one allocated license as unavailable from the set of licenses ensures that the at least one allocated license does not get reallocated to some other user device while already being allocated to the at least one user device.

Optionally, the method further comprises:

receiving a usage history of the target application for each of the plurality of user devices; and allocating, to a given user device, the available license based on a usage history of the given user device.

In this regard, the term "usage history" as used herein refers to a record or history of actions, events, or interactions that each of the plurality of user devices has performed within the target application over a period of time. Notably, the usage history of the target application for each of the plurality of user devices enables to gain insights on type of actions performed within the target application by each of the plurality of user devices. Notably, the usage history enables to determine the type of the available license that is appropriate to be allocated to the given user device, and thus, subsequently, the available license is allocated to the given user device based on the usage history of the given user device. A technical effect is that the available license is allocated to the given user device based on the usage history in addition to the usage state of the given user device. Beneficially, allocating the available license to the given user device based on the usage history of the given user device enables to adapt to changes in patterns of using the target application by the given user associated with the given user device.

Optionally, the type of the allocated license is the read-only license if the usage history of the given user device indicates a read-only activity during a pre-determined time period prior to the allocation. In this regard, the type of the allocated license will determine a level of access for the target application, given to the given user device. The term "read-only activity" refers to that activity performed by the given user device with the target application in which the given user only reads or views a content or information present in the target application without making any changes within the target application. The term "pre-determined time period" refers to a specific period of time for which the usage history of the given user device is monitored to determine whether the usage history of the given user device indicates the read-only activity. Subsequently, the type of the allocated license for the given user device is the read-only license as the usage history of the given user device indicates the read-only activity during the pre-determined time period prior to the allocation. A technical effect is that the type of the allocated license for the given user device is suitable for the given user device based on the usage history of the given user device.

The term "inactive state" as used herein refers to that state in which the target application is not being run or executed on the at least one user device in the current instance of time. Typically, the inactive state indicates that the target application is not being used by the at least one user device in the current instance of time. Notably, the usage state of the target application for the at least one user device changes from the active state to the inactive state when the target application that was running on the at least one user device is closed, indicating that the target application is not being used on the at least one user device anymore.

Optionally, the method further comprises:

receiving a second information indicative of a status of an automated login feature for each of the plurality of user devices;

determining if the received second information indicates that the automated login feature is enabled on a given user device;

determining if the usage state of the target application for the given user device is an inactive state; and when it is determined that the automated login feature is enabled on the given user device and the usage state of the target application for the given user device is the inactive state, disabling the automated login feature on the given user device.

In this regard, the term "automated login feature" as used herein refers to a feature that automatically allocates the available license to the given user device to access the target application, when a given user logs into the given user device. The term "second information" as used herein refers to an information showing the status of the automated login feature in the given user device from amongst the plurality of user devices. In other words, the second information indicates whether the automated login feature is enabled or disabled on the given user device. Notably, the second information is received for each of the plurality of user devices, so that the status of the automated login feature is determined for each of the plurality of user devices. Notably, the given user device for which the automated login feature is enabled is determined by processing the second information for each of the plurality of user devices. Subsequently, the usage state of the given user device is analyzed for determining whether the usage state of the target application for the given user device is the inactive state. Notably, the automated login feature for the given device being enabled and the usage state of the target application for the given user device implies that the available license may get allocated to the given user device for accessing the target application even when the target application is not being used on the given user device. Subsequently, the automated login feature on the given user device is disabled for ensuring that the available license does not get allocated to the given user device when the target application is not being used on the given user device. A technical effect is that the dynamic allocation of the license is further optimized by ensuring that the available license does not get allocated to the given user device when the target application is not being used on the given user device.

Typically, when the at least one user device stops using the target application, then the usage state of the target application changes from the active state to the inactive state. It will be appreciated that the corresponding allocated license refers to the license that is correspondingly allocated to each user device from amongst the at least one user device. Notably, when the usage state of the target application for the at least one user device changes from the active state to the inactive state, the corresponding allocated license for the each of the at least one user device is deallocated as the target application is not being used on the at least one user device anymore, and thus, each of the at least one user device does not require the corresponding allocated license anymore. After the deallocation, the at least one deallocated license are marked as available in the set of licenses, so that the at least one deallocated license can be reallocated again as required.

Optionally, the method further comprises generating a notification notifying about a deallocation of the at least one allocated license. The term "notification" as used herein refers to a message or alert that the target application generates to inform the plurality of user devices about the deallocation of the at least one allocated license. In this regard, whenever the deallocation of the at least one user device happens, the notification about the deallocation is generated to notify that the at least one allocated license has now been deallocated and is available in the set of licenses for reallocation. Optionally, the notification is generate in form of a sound alert, a text message, and the like. A technical effect of generating the notification is that the deallocation of the at least one allocated license is effectively notified in real-time.

Optionally, the method further comprises:

determining if the usage state of the target application for at least one other user device is the active state, and if at least one other license is marked unavailable from the set of licenses; and when the usage state of the target application for the at least one other user device is in the active state and the at least one other license is marked unavailable from the set of licenses, reallocating, to the at least one other user device, the at least one deallocated license for accessing the target application.

In this regard, the term "at least one other user device" as used herein refers to those one or more user devices whose usage state is the inactive state at the time instance when the usage state for the at least one user device is active state, but whose usage state is the active state at another instance of time. It will be appreciated that the "at least one other user device" refers to "one other user device" in some implementations, and "a plurality of other user devices" in other implementations. The term "at least one other license" as used herein refers to one or more licenses other than the at least one license from amongst the set of licenses. Notably, the at least one other license being marked as unavailable from the set of licenses implies that the at least one other license is already allocated to one or more other user devices. The usage state of the target application for the at least one other user device being the active state and the at least one other license being marked unavailable from the set of licenses implies that the at least other user device requires the license for accessing the target application, however the at least one other license is unavailable and thus, only the at least one deallocated license is available to be reallocated to the at least one other user device. Subsequently, the at least one deallocated license is reallocated to the at least one other user device for accessing the target application. A technical effect is that the dynamic allocation of the license successfully incorporates the reallocation of the at least one deallocated license.

The present disclosure also relates to the system as described above. Various embodiments and variants disclosed above, with respect to the aforementioned method, apply mutatis mutandis to the system.

Throughout the present disclosure the term "license allocation server" as used herein refers to a computational element that is operable to execute instructions of the system for the dynamic allocation of the license. Examples of the license allocation server include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the license allocation server may refer to one or more individual servers, processing devices and various elements associated with a processing device that may be shared by other processing devices. Additionally, one or more individual servers, processing devices and elements are arranged in various architectures for responding to and processing the instructions that execute the instructions of the system for the dynamic allocation of the license.

The term "communicably coupled" as used herein refers to a functional and established communication link between the license allocation server and the plurality of user devices which enables an exchange of data therebetween. Optionally, the license allocation server is communicably coupled to the plurality of user devices via one of: a wired connection, wireless communication, a bluetooth connection and the like that facilitates data exchange between the license allocation server and the plurality of user devices.

Optionally, the license allocation server is further configured to:

determine if the usage state of the target application for at least one other user device is the active state, and if at least one other license is marked unavailable from the set of licenses; and when the usage state of the target application for the at least one other user device is the active state and if the at least one other license is marked unavailable from the set of licenses, to reallocate, to the second user device, the at least one deallocated license to access the target application.

Optionally, the license allocation server is further configured to poll the at least one user device to check if the usage state of the target application and if at least one of: the usage state of the target application changes from the active state to the inactive state, the target application is not responding, the at least one user device is not reachable, then to deallocate, for each of the at least one user device, the corresponding allocated license, and to mark the at least one deallocated license as available in the set of licenses. In this regard, in addition to the usage state of the target application to change from the active state to the inactive state, the target application not responding and the at least one user device being not reachable also implies that the target application is not being used on the at least one user device. Subsequently, the corresponding allocated license for each of the at least one user device is deallocated. Optionally, the license allocation server polls the at least one user device by sending alert messages to the at least one user device. A technical effect is that the deallocation of the corresponding allocated license for each of the at least one user device leads to an improved dynamic allocation.

The present disclosure also relates to the computer-readable storage medium as described above. Various embodiments and variants disclosed above, with respect to the aforementioned method and the aforementioned system, apply mutatis mutandis to the computer-readable storage medium.

The term "processing arrangement" as used herein refers to an arrangement that includes one or more processing units and servers for executing instructions and performing dynamic allocation of licenses for accessing the target application. Examples of the processing arrangement include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processing arrangement may refer to one or more individual servers, processing devices and various elements associated with a processing device that may be shared by other processing devices. Moreover, the instructions for the dynamic allocation of the license are stored on the computer-readable storage medium.

According to an embodiment of the present disclosure, there are five user devices K1, K2, K3, K4 and K5 associated with the organization. The organization is provided with three licenses L1, L2 and L3 by the license allocation server. The license allocation server receives the second information for the five user devices and determines if the status of the automated login feature is enabled on the given device from amongst the five user devices. Subsequently, the license allocation server disables the automated login feature on the given user device when the status of the automated login feature is enabled on the given device. In an implementation, the licenses L1, L2 and L3 are the one or more licenses available to be allocated, which are allocated according to a first come, first serve principle and the first three user devices K1, K2 and K3 for whose usage state is the active state are the at least one user device which are allocated with the available licenses L1, L2 and L3, respectively. The three user devices are using the three available licenses and there is no license available for allocation to other user devices. In another implementation, licenses L1, L2 and L3 are automatically reserved with the log in of the user devices. In such case, even if the user device does not need to connect to the license allocation server, the licenses will be reserved anyway. The user device K1 has reserved license L1, the user device K2 has reserved license L2 and the user device K3 has reserved license L3, with the automatic merge. However, the user device K3 is not using the target application but still there are no free licenses available for the further allocation. Moreover, the present invention checks the auto login feature of the target application and the status of the target application within the user devices K1, K2 and K3. After finding that the user device K3 is not using the target application and is in the inactive state, the license allocation server will unreserved the License L3 from the user device K3 and set free the license L3, which is now available for further allocation.

According to another embodiment of the present disclosure, there is an organization which has five user devices named K1, K2, K3, K4 and K5. The organization has purchased two named write licenses LW1 and LW2, one floating write license LF1 and one maned read-only license LR1. In first scenario, the available licenses are divided among the user devices according to the job functions and job assumptions of the user devices. As per the job functions, the user device K1 has got license LW1, the user device K2 has got LW2, the user device K3 uses license LF1 as per the need, the user device K4 has got license LR1 and the user device K5 uses LF1 license as per the need. However, the allocation of licenses is done without knowing the usage history of the user devices. In the second scenario, usage history of the user devices is analyzed by the license allocation server and the following observations has been observed. The user device K2 does not perform writing operations, the user device K3 actively performs writing operations, the user device K4 rarely uses the license and the user device K5 often performs read-only operations. According to these conclusions license types are defined and the redistribution of licenses happens as per the actual needs. Now the licenses are redistributed as the user device K1 is allowed to keep LW1, the user device K2 is modified to use LF1 as per its need, the user device K3 gets LW2 license, the user device K4 is modified to use LF1 as per the need and the user device K5 gets LR1 license. By doing such distribution, the licenses acquired by the organization are sufficient for the need and new license purchases are avoided.

DETAILED DESCRIPTION OF THE DRAWINGS

Referring to FIG. 1, illustrated is a flowchart depicting steps of a method for dynamic allocation of a license for accessing a target application within an organization, the organization comprising a plurality of user devices associated with the target application, in accordance with an embodiment of the present disclosure. At step 102, a set of licenses comprising one or more licenses available to be allocated to the plurality of user devices, are provided, wherein number of available one or more licenses is less than number of user devices. At step 104, a first information is received for each of the plurality of user devices, wherein the first information is indicative of a usage state of the target application on a corresponding user device. At step 106, if the usage state of the target application for at least one user device is an active state is determined. At step 108, when the target application for the at least one user device is in the active state, an available license for accessing the target application is allocated to each of the at least one user device and the at least one allocated license is marked as unavailable from the set of licenses. At step 110, if the usage state of the target application for the at least one user device changes from the active state to an inactive state, is determined. At step 112, when the target application for the at least one user device changes from the active state to the inactive state, the corresponding allocated license for each of the at least one user device is deallocated and the at least one deallocated license is marked as available in the set of licenses.

The aforementioned steps are only illustrative and other alternatives can also be provided where one or more steps are added, one or more steps are removed, or one or more steps are provided in a different sequence without departing from the scope of the claims herein.

Figure 2:
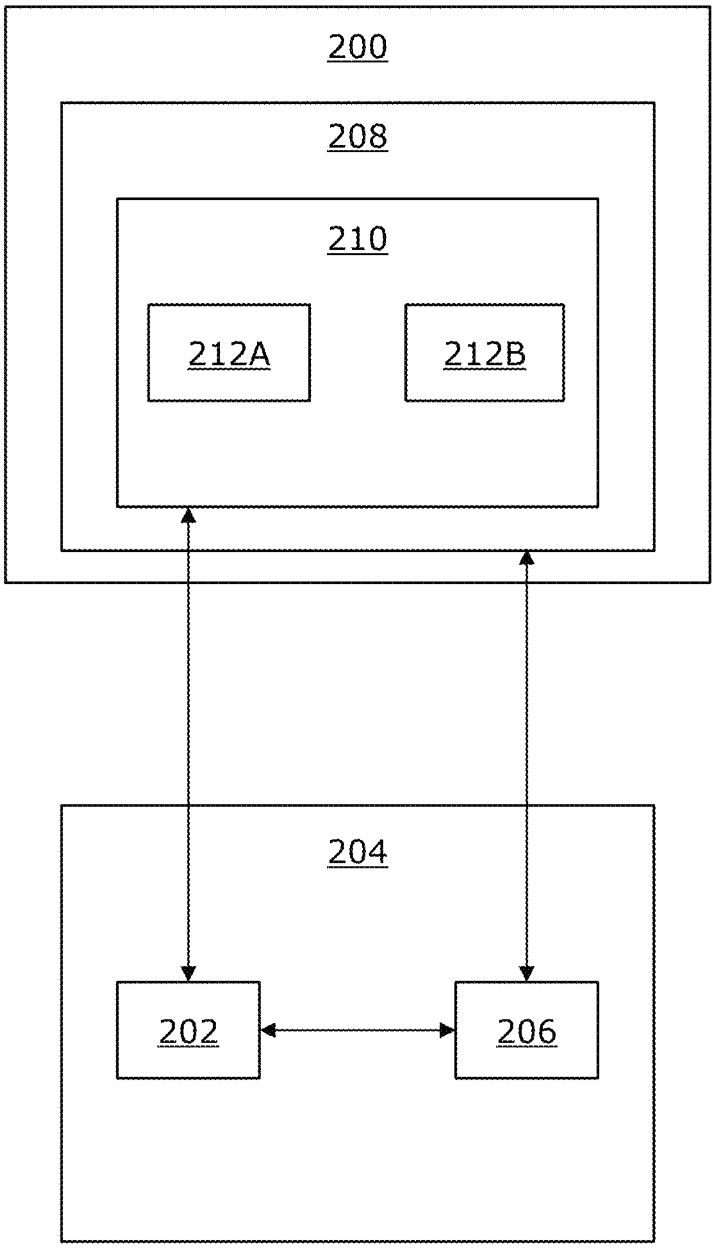
FIG. 2 is an illustration of a block diagram of an environment implementing a system for dynamic allocation of a license for accessing a target application within an organization, in accordance with an embodiment of the present disclosure.

Referring to FIG. 2, illustrated is a block diagram of an environment implementing a system 200 for dynamic allocation of a license for accessing a target application 202 within an organization 204, the organization 204 comprising a plurality of user devices (depicted as a user device 206)

associated with the target application 202, the system 200 comprising a license allocation server 208 communicably coupled to the plurality of user devices 206, in accordance with an embodiment of the present disclosure. The license allocation server 208 is configured to provide a set of licenses 210 comprising one or more license (depicted as a first license 212A and a second license 212B) available to be allocated to the plurality of user devices 206, wherein number of available one or more licenses 212A-B is less than number of user devices. Moreover, the license allocation server 208 is configured to receive a first information for each of the user devices, wherein the first information is indicative of a usage state of the target application 202 on a corresponding user device. Furthermore, the license allocation server 208 is configured to determine if the usage state of the target application 202 for at least one user device is an active state. Furthermore, the license allocation server 208 is configured to when the target application 202 for the at least one user device is in the active state, allocate, to each of the at least one user device, an available license to access the target application 202, and to mark the at least one allocated license as unavailable from the set of licenses 210. Furthermore, the license allocation server 208 is configured to determine if the usage state of the target application 202 for the at least one user device changes from the active state to an inactive state. Furthermore, the license allocation server 208 is configured to when the target application 202 for the at least one user device changes from the active state to the inactive state, deallocate, for each of the at least one user device, the corresponding allocated license, and to mark the at least one deallocated license as available in the set of licenses 210.

Figure 3:
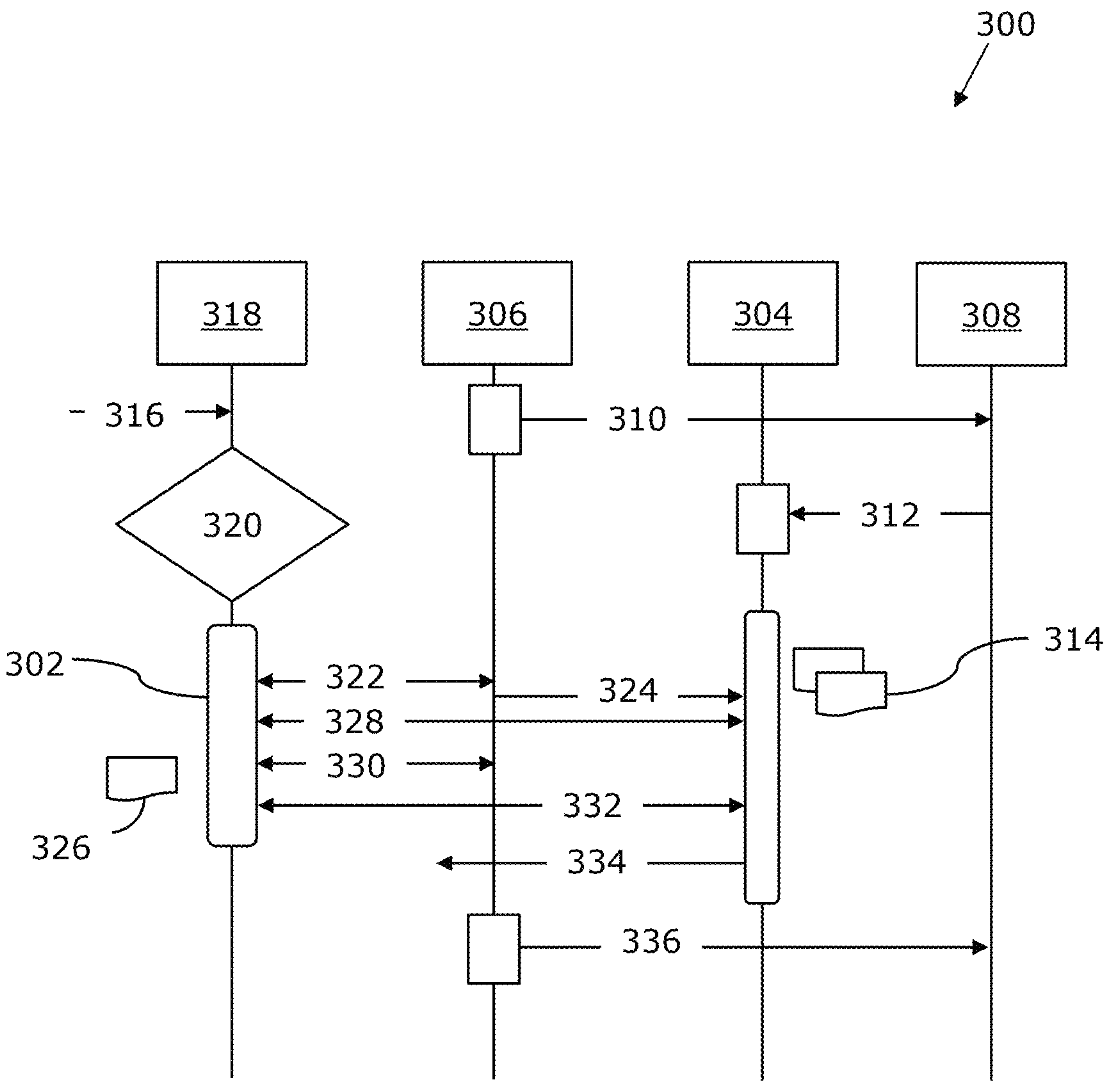
FIG. 3 is a schematic illustration depicting an implementation of a system for dynamic allocation of a license for accessing a target application within an organization, in accordance with an embodiment of the present disclosure.

Referring to FIG. 3, illustrated is a schematic illustration depicting an implementation of a system 300 for dynamic allocation of a license for accessing a target application 302 within an organization, the organization comprising a plurality of user devices associated with the target application, the system comprising a license allocation server 304 communicably coupled to the plurality of user devices in accordance with an embodiment of the present disclosure. As shown, optionally, the system 300 further comprises a data server 306 configured to collect a usage history of the plurality of user devices. Optionally, the system 300 further comprises a license rules generation server 308, wherein the license allocation server 304, the data server 306 and the license rules generation server 308 are part of a server arrangement.

At step 310, the data server 306 shares the usage history of the plurality of user devices to the license rules generation server 308. The license rules generation server 308 analyses the historical data and at step 312, the license rules generation server 308 provides a set of rules and instructions to the license allocation server 304. The license allocation server 304 comprises a set of licenses 314. At step 316, a user logs in to a user device 318. At step 320, an automatic login module checks a status of an automated login feature for each of the plurality of user devices, wherein when it is determined that the automated login feature is enabled on a given user device and a usage state of the targeted application for the given user device is an inactive state, the automated login feature is disabled on the given user device. At step 322, the target application 302 is opened on the user device 318, where the user interacts with the target application 310 via sending a request for data to the data server 306. At step 324, the request for data is sent from the data server 306 to the license allocation server 304. Alternatively, the target application 202 may sent the request to the license allocation server 304.

As the usage state of the target application 302 for the user device 318 is an active state, the license allocation server 306 allocates an available license 326 to the user device for the target application 302. At steps 322 and 330, during an operation of the target application 302 on the user device 318, multiple data transfers between the target application 302 and the data server 306 takes place. At steps 328, 332 and 334, the license allocation server 304 communicates with the target application 302 to determine the usage state of the target application 302 for the user device 318. At step 334, if no reply is received from the target application 302, then the usage state of the target application 302 is determined to change from the active state to the inactive state. The allocated license 326 is thus, deallocated and marked as available in the set of licenses 314 for reallocation. At step 336, the usage history of the target application 302 for the user device 318 is provided to the license rules generation server 308, which then updates rules of providing and allocating the set of licenses 314.

Figure 4A:
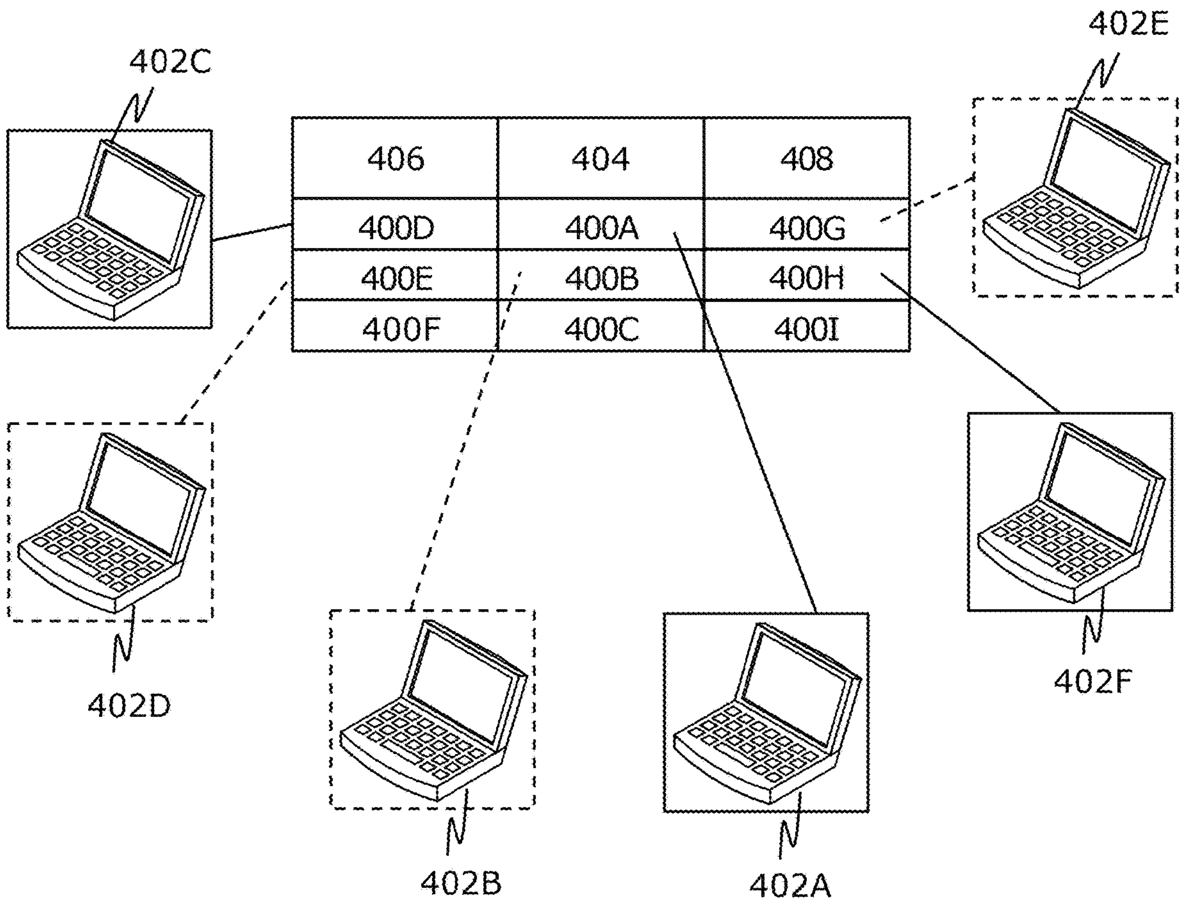
FIGS. 4A-C are schematic illustrations of different examples of dynamically allocating a set of licenses for accessing a target application within an organization, in accordance with an embodiment of the present disclosure.
Figure 4B:
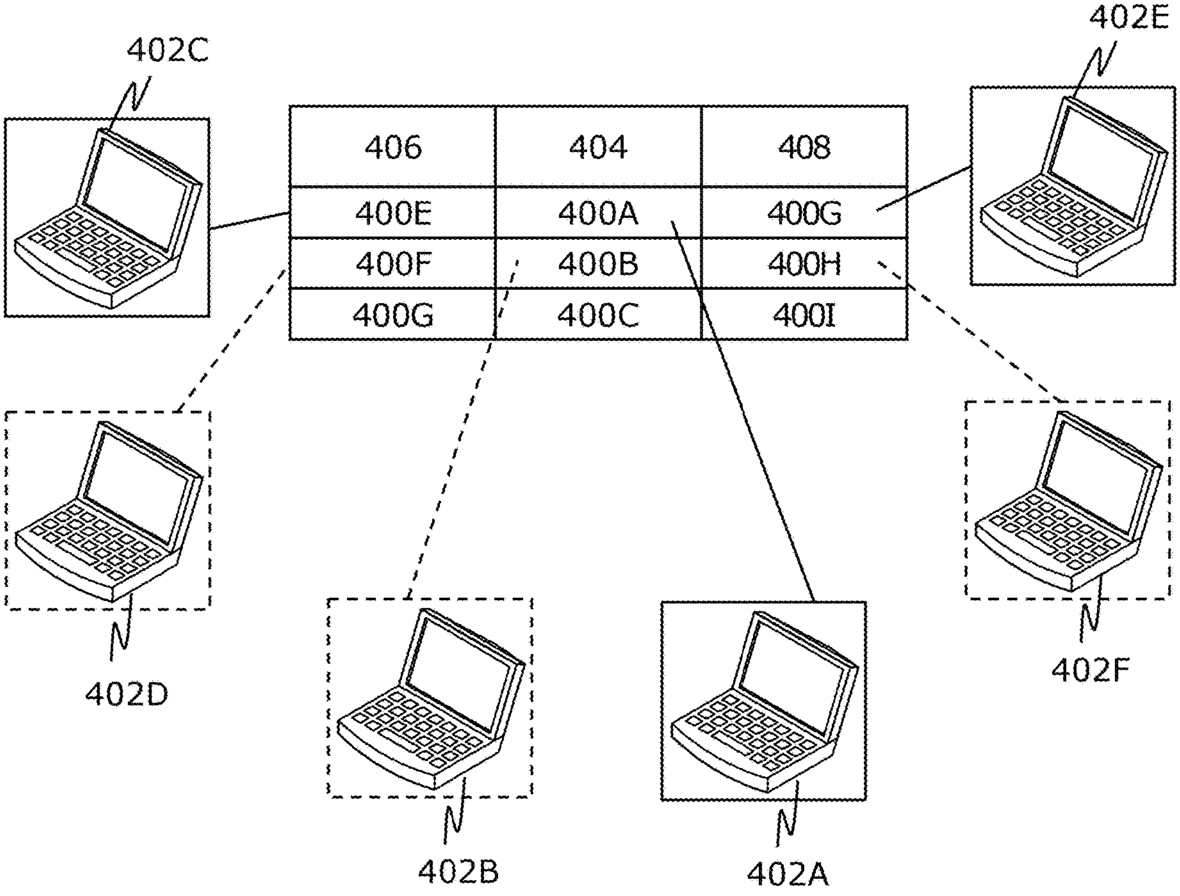
Figure 4C:
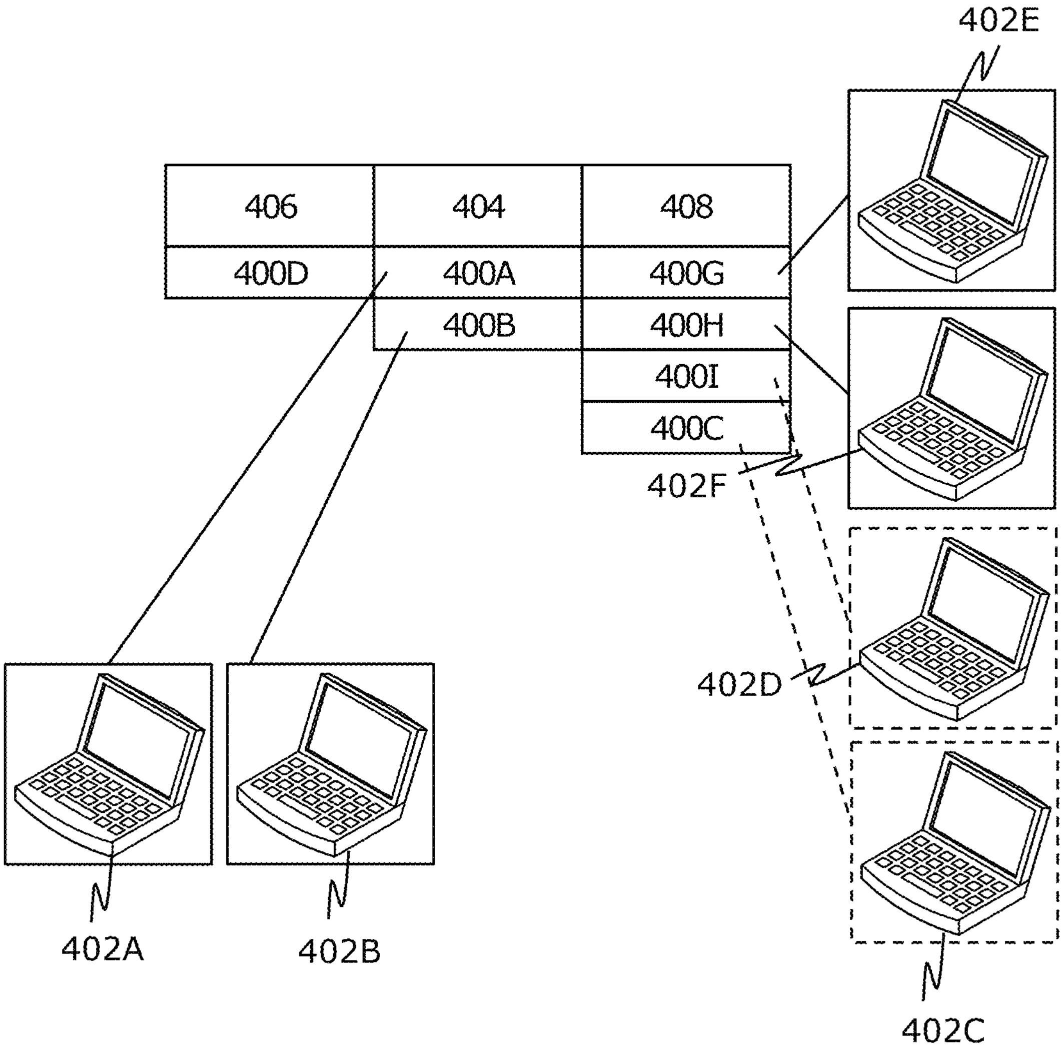

Referring to FIGS. 4A-C, illustrated are schematic illustrations of different examples of dynamically allocating a set of licenses 400A-I for accessing a target application within an organization, in accordance with an embodiment of the present disclosure. As shown in FIG. 4A, in a first example, the organization comprises a plurality of user devices 402A-F, associated with the target application (such as a SaaS program). A type of the licenses 400A-C from amongst the set of licenses 400A-I is a named license 404, the type of the licenses 400D-F from amongst the set of licenses 400A-I is a floating license 406 and the type of the licenses 400G-I from amongst the set of licenses 400A-I is a read-only license 408. Herein, the usage state of the target application for the user devices 402A-F is an active state, and subsequently, the licenses 400A, 400B, 400D, 400E, 400G, and 400H are allocated to the user devices 402A, 402B, 402C, 402D, 402E, and 402F, respectively, for accessing the target application. Moreover, the licenses 400C, 400G and 400I are marked as available in the set of licenses 400A-I.

As shown in FIG. 4B, in a second example, the usage state of the target application for the user devices 402B, 402D, and 402F changes from the active state to an inactive state, and subsequently, the licenses 400B, 400F, and 400H are deallocated from the user devices 402B, 402D, and 402F, respectively. Moreover, the licenses 400B, 400F and 400H are also marked as available in the set of licenses 400A-I.

As shown in FIG. 4C, in a third example, the usage state of the target application for the user devices 402B and 402F is gain determined to be the active state, and subsequently, the license 400B and 400H are allocated to the user device 402B and 402F, respectively. Moreover, a usage history of the user device 402C indicates a read-only activity, and the type of license 400C is changed from the named license 404 to the read-only license 408, and subsequently, the license 400C is allocated to the user device 402C. Furthermore, the license 4001 is allocated to the user device 402D.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for dynamic allocation of a license for accessing a target application within an organization, the organization comprising a plurality of user devices associated with the target application, the method comprising:

providing, by a license allocation server, a set of licenses comprising one or more license available to be allocated to the plurality of user devices, wherein number of available one or more licenses is less than number of user devices;

receiving, by the license allocation server, a first information for each of the plurality of user devices, wherein the first information is indicative of a usage state of the target application on a corresponding user device;

determining, by the license allocation server, if the usage state of the target application for at least one user device is an active state;

when the target application for the at least one user device is in the active state, allocating, to each of the at least one user device, an available license for accessing the target application, and marking the at least one allocated license as unavailable from the set of licenses;

determining, by the license allocation server, if the usage state of the target application for the at least one user device changes from the active state to an inactive state;

when the target application for the at least one user device changes from the active state to the inactive state, deallocating, for each of the at least one user device, the corresponding allocated license, and marking the at least one deallocated license as available in the set of licenses, wherein a type of the allocated license is one of: a named license, a floating license, a read-only license;

wherein the type of the allocated license is the read-only license if the usage history of the given user device indicates a read-only activity with the target application during a pre-determined time period prior to the allocation;

receiving a second information indicative of a status of an automated login feature for each of the plurality of user devices;

determining if the received second information indicates that the automated login feature is enabled on a given user device;

determining if the usage state of the target application for the given user device is the inactive state; and when it is determined that the automated login feature is enabled on the given user device and the usage state of the target application for the given user device is the inactive state, disabling the automated login feature on the given user device.

2. The method according to claim 1, wherein the method further comprises:

determining if the usage state of the target application for at least one other user device is the active state, and if at least one other license is marked unavailable from the set of licenses; and when the usage state of the target application for the at least one other user device is the active state and the at least one other license is marked unavailable from the set of licenses, reallocating, to the at least one other user device, the at least one deallocated license for accessing the target application.

3. The method of claim 1, further comprising generating a notification notifying about the deallocation of the at least one allocated license.

4. The method according to claim 1, further comprising:

receiving a usage history of the target application for each of the plurality of user devices; and allocating, to a given user device, the available license based on a usage history of the given user device.

5. The method according to claim 1, wherein the target application comprises a sub module and the one or more licenses available to be allocated provide access to use the sub module.

6. The method according to claim 1, wherein the usage state of the target application for the at least one user device is the active state, when at least one of:

an executable process associated with the target application is implemented on the at least one user device;

at least one user device identification indicates corresponding at least one user logging into the target application;

the executable process associated with the target application performs a predetermined number of actions during a predefined time period.

7. A system for dynamic allocation of a license for accessing a target application within an organization, the organization comprising a plurality of user devices associated with the target application, the system comprising a license allocation server communicably coupled to the plurality of user devices, the license allocation server configured to:

provide a set of licenses comprising one or more licenses available to be allocated to the plurality of user devices, wherein number of available one or more licenses is less than number of user devices;

receive a first information for each of the plurality of user devices, wherein the first information is indicative of a usage state of the target application on a corresponding user device;

determine if the usage state of the target application for at least one user device is an active state;

when the target application for the at least one user device is in the active state, allocate, to each of the at least one user device, an available license to access the target application, and to mark the at least one allocated license as unavailable from the set of licenses;

determine if the usage state of the target application for the at least one user device changes from the active state to an inactive state; and when the target application for the at least one user device changes from the active state to the inactive state, deallocate, for each of the at least one user device, the corresponding allocated license, and to mark the at least one deallocated license as available in the set of licenses, wherein a type of the allocated license is one of: a named license, a floating license, a read-only license;

wherein the type of the allocated license is the read-only license if the usage history of the given user device indicates a read-only activity within the target application during a pre-determined time period prior to the allocation;

receiving a second information indicative of a status of an automated login feature for each of the plurality of user devices;

determining if the received second information indicates that the automated login feature is enabled on a given user device;

determining if the usage state of the target application for the given user device is the inactive state; and when it is determined that the automated login feature is enabled on the given user device and the usage state of the target application for the given user device is the inactive state, disabling the automated login feature on the given user device.

8. The system according to claim 7 where in the license allocation server is further configured to:

determine if the usage state of the target application for at least one other user device is the active state, and when at least one other license is marked unavailable from the set of licenses; and when the target application for the second user device is in the active state, to reallocate, to the second user device, the at least one deallocated license to access the target application.

9. The system according to claim 7, wherein the license allocation server is further configured to poll the at least one user device to check if the usage state of the target application and if at least one of: the usage state of the target application changes from the active state to the inactive state, the target application is not responding, the at least one user device is not reachable, then to deallocate, for each of the at least one user device, the corresponding allocated license, and to mark the at least one deallocated license as available in the set of licenses.

10. A non-transitory computer-readable storage medium comprising instructions for dynamic allocation of a license for accessing a target application, which when executed by a processing arrangement, cause the processing arrangement to execute the steps of the method of claim 1.

* * * * *